(12) United States Patent
Jin et al.

(10) Patent No.: US 11,023,285 B2
(45) Date of Patent: Jun. 1, 2021

(54) ACCELERATION METHOD FOR FPGA-BASED DISTRIBUTED STREAM PROCESSING SYSTEM

(71) Applicant: Huazhong University of Science and Technology, Hubei (CN)

(72) Inventors: Hai Jin, Hubei (CN); Song Wu, Hubei (CN); Die Hu, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 16/752,870

(22) Filed: Jan. 27, 2020

(65) Prior Publication Data
US 2020/0326992 A1   Oct. 15, 2020

(30) Foreign Application Priority Data

Apr. 12, 2019  (CN) .......................... 201910297011.3

(51) Int. Cl.
*G06F 9/50* (2006.01)
*G06F 9/445* (2018.01)
*G06F 9/48* (2006.01)

(52) U.S. Cl.
CPC ........ *G06F 9/5083* (2013.01); *G06F 9/44505* (2013.01); *G06F 9/485* (2013.01); *G06F 9/505* (2013.01)

(58) Field of Classification Search
CPC .................................................... G06F 9/5083
See application file for complete search history.

(56) References Cited

U.S. PATENT DOCUMENTS

2013/0063450 A1* 3/2013 Kabawala ............. G06F 9/5044
345/502
2015/0169380 A1* 6/2015 Inoue .................... G06F 9/3885
718/105

* cited by examiner

*Primary Examiner* — Charlie Sun
(74) *Attorney, Agent, or Firm* — Michael X. Ye; Morris, Manning & Martin, LLP

(57) ABSTRACT

The present invention relates to an acceleration method for an FPGA-based distributed stream processing system, which accomplishes computational processing of stream processing operations through collaborative computing conducted by FPGA devices and a CPU module and at least comprises following steps: building the FPGA-based distributed stream processing system having a master node by installing the FPGA devices on slave nodes; dividing stream applications into first tasks suitable to be executed by the FPGA devices and second tasks suitable to be executed by the CPU module; and where the stream applications submitted to the master node are configured with kernel files that can be compiled and executed by the FPGA devices or with uploading paths of the kernel files, making the master node allocate and schedule resources by pre-processing the stream applications.

7 Claims, 4 Drawing Sheets

ACCELERATION METHOD FOR FPGA-BASED DISTRIBUTED STREAM PROCESSING SYSTEM

FIELD

The present invention relates to distributed stream computing, and more particularly to a method of acceleration for an FPGA-based distributed stream processing system.

DESCRIPTION OF RELATED ART

Presently, the development of big data technologies has been incandesced. The explosive growth of data, diversity of data types, and continuously increased data generation velocity altogether lead to higher and higher demands on data processing. Many applications for real-time data processing, such as real-time shopping recommendation, social data real-time analytics, web log processing, smart grids and the like are highly dependent on real-time data processing, and as a stream computing technology has developed and becomes an emerging focus of research. More and more stream data computing platforms are launched. They depend on real-time processing technologies and have gradually adopted in business and research circles as important on-line analyzing and processing tools.

To evaluate a data stream computing system, the two most important performance indicators are latency and throughput. A common challenge faced by these stream processing platforms is how to improve the two indicators, or, how to get balance between the two indicators. Now Moore's Law is going to its end, and the age of "free lunch" will soon no more exist. This gave rise to the need of alternatives for speeding up computation, processor acceleration technologies are now a promising solution to such a challenge.

GPU and FPGA represent the two most dominant processor acceleration technologies nowadays. By comparison, FPGA acceleration components are relatively advantageous in terms of energy efficiency ratio and absolute performance. Recently, with the development of semiconductor process technologies, FPGA chips have gained increasingly improved capacity and operating frequency. Meanwhile, research on reconfigurable computing in the field of FPGA-oriented acceleration technologies has obtained breakthrough results in the areas of architecture and programming technologies. Therefore, FPGA acceleration technologies have been rapidly spread and extensively adopted in academic and industrial communities. Intel OpenCL SDK for FPGA provides a simple path for FPGA development. It allows users to program applications for acceleration conveniently using just OpenCL frameworks and a certain level of knowledge of the C language, without struggling with complicated hardware details. At the same time, FPGA acceleration technologies have been extensively used and proven in tests conducted by leading data center companies. For example, China Patent Publication No. CN108776649A discloses CPU+FPGA heterogeneous computing system and its acceleration method, wherein plural FPGA acceleration units work with a CPU main controller unit to execute a computing task. The CPU main controller unit serves to do logic decision and control management so as to assign computing tasks to the FPGA acceleration units. The FPGA acceleration units serve to accelerate computing tasks and are each internally divided into static regions and dynamically reconfigurable regions. The static regions serve to enable PCIe DMA communication, SRIO communication, and DDR control. The dynamically reconfigurable regions execute kernel functions issued by the CPU main controller unit, thereby accelerating the computing tasks. The foregoing known approach is applicable to various types of computing tasks for parallel acceleration processing and stream acceleration processing, thereby significantly improving processing throughput, reducing task execution time and maximizing computing performance of computers.

Hence, it is worth going deep into how to use FPGA to accelerate stream computing systems or platforms. With excellent parallelism and energy consumption, FPGA when working with a stream computing system is expected to break the bottleneck of system performance and improve system performance. Hence, how to introduce FPGA into stream computing systems and make use of the systems has become one of the current research hotspots. The present invention thus provides an acceleration method wherein FPGA devices are used in distributed stream processing systems such as Storm systems so as to solve systems' bottleneck.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

A word "module" as described in the description refers to a hardware, a software or any combination of a hardware and a software which can execute the function related to "module".

In view of the shortcomings of the prior art, the present invention provides an acceleration method for an FPGA-based distributed stream processing system, which accomplishes computational processing of stream processing operations through collaborative computing conducted by FPGA devices and a CPU module and at least comprises following steps of building the FPGA-based distributed stream processing system having a master node by installing the FPGA devices on slave nodes; dividing stream applications into first tasks suitable to be executed by the FPGA devices and second tasks suitable to be executed by the CPU module; and where the stream applications submitted to the master node are configured with kernel files that can be compiled and executed by the FPGA devices or with uploading paths of the kernel files, making the master node allocate and schedule resources by pre-processing the stream applications.

According to one preferred embodiment, wherein the step of making the master node allocate and schedule the resources comprising at least the following steps of acquiring all of the stream processing operations to be scheduled in a system cluster and performing at least addition of system components, addition of data analyzing components and standardization on each said stream processing operation so as to accomplish the pre-processing; obtaining a first overall load of the first tasks, a second overall load of the second tasks and a third overall load of the FPGA devices that is in an idle state; and where the third overall load is smaller than or equal to zero, scheduling all the stream processing operations to the CPU module for execution, and where the third overall load greater than zero and the first overall load is smaller than the third overall load, scheduling the first tasks to the FPGA devices for execution and scheduling the second tasks to the CPU module for execution, or where the third overall load is greater than zero and the first overall load is greater than the third overall load, dividing the first tasks into first sub-tasks and second sub-tasks based on the third overall load, wherein the first sub-tasks are scheduled to the FPGA devices for execution and the second sub-tasks are transmitted to the CPU module for execution by transforming the second sub-tasks into the second tasks.

According to one preferred embodiment, wherein the step of making the master node allocate and schedule the resources further comprising a step of where the stream applications include the first tasks and the kernel files or the uploading paths of the kernel files are all submitted to the master node, determining that the stream applications are legitimate and scheduling the stream applications.

According to one preferred embodiment, wherein the pre-processing at least comprises a step of where there is any special component in topologies that requires operation of the first tasks and a kernel function designation executable to the FPGA devices is configured for the special component, instantiating every component in the topologies into either executors for the first tasks or executors for the second tasks of a corresponding amount based on parallelism settings and choices of component types by which users submitted the topologies.

According to one preferred embodiment, wherein the CPU module at least comprises a first job executor, a second job executor and a third job executor, in which the FPGA devices and the CPU module perform collaborative computing on the stream processing operation by using the first job executor to receive a plurality of data transmitted from upstream, to process the data one by one in a pipeline, and to send processing results to the second job executor arranged downstream through threads; using the second job executor to receive the processing results from the first job executor and cache the processing results in an on-board memory thereof, and, when an amount of the cached data reaches a preset threshold, to send all the cached data to the FPGA devices through an interface; and using the third job executor to receive the processing results from the second job executor according to a predetermined data dependency, and to perform subsequent computational processing on the processing results.

According to one preferred embodiment, wherein the acceleration method for the distributed stream processing system at least further comprising a step of when the master node schedules the stream processing operations, based on a runtime of the cluster, acquiring information about an idle resource amount of each said slave node and allocating tasks to be scheduled to the slave node (2) currently having the idlest resources.

According to one preferred embodiment, wherein building the FPGA-based distributed stream processing system at least comprises steps of installing the FPGA devices on the slave nodes by means of interface connection, and configuring the slave nodes with a software development kit for the FPGA devices so as to form a universal programming environment, and building a host end; activating a listening process on each said slave node to listen to computing tasks allocated to a hardware device, and connecting the listening process to the host end through a programming interface; making the listening process run on the slave nodes send a request to the host end through the programming interface so as to acquire FPGA resource state information, and making the listening process build heartbeat information on a basis of the FPGA resource state information and periodical synchronize the heartbeat information to the runtime of the cluster; and making the master node acquire the heartbeat information so as to schedule the stream processing operation.

According to one preferred embodiment, wherein dividing the stream applications into the first tasks and the second tasks at least comprises steps of building a directed acyclic graph that has a plurality of data processing nodes, and implementing each said data processing node as at least one computing model; and implementing the computing models as first tasks based on a computational intensity or a data processing load of the computing models.

The present invention further provides an FPGA-based distributed stream processing system, wherein the FPGA devices and a CPU module conduct computational processing a stream processing operation through collaborative computing, the system being characterized in having a master node and being built by installing the FPGA devices to slave nodes, being configured to divide stream applications into first tasks suitable to be executed by the FPGA devices and second tasks suitable to be executed by the CPU module; and where the stream applications submitted to the master node are configured with kernel files that can be compiled and executed by the FPGA devices or with uploading paths of the kernel files, make the master node allocate and schedule resources by pre-processing the stream applications.

According to one preferred embodiment, wherein making the master node allocate and schedule the resources at lease comprising acquiring all of the stream processing operations to be scheduled in a system cluster and performing at least addition of system components, addition of data analyzing components and standardization on each said stream processing operation so as to accomplish the pre-processing; obtaining a first overall load of the first tasks, a second overall load of the second tasks and a third overall load of the FPGA devices (401) that is in an idle state; and where the third overall load is smaller than or equal to zero, scheduling all the stream processing operations to the CPU module for execution, and where the third overall load greater than zero and the first overall load is smaller than the third overall load, scheduling the first tasks to the FPGA devices for execution and scheduling the second tasks to the CPU module for execution, or where the third overall load is greater than zero and the first overall load is greater than the third overall load, dividing the first tasks into first sub-tasks and second sub-tasks based on the third overall load, wherein the first sub-tasks are scheduled to the FPGA devices for execution and the second sub-tasks are transmitted to the CPU module for execution by transforming the second sub-tasks into the second tasks.

The present invention provides the following beneficial technical effects:

(1) The present invention providing increased system throughput, reduced system latency and improved overall performance of stream computing systems by introducing FPGA devices that have hardware parallelism and energy consumption to a distributed stream processing system to participate in scheduling and computing operations, so as to unload computation-intensive tasks or heavy load tasks from the system to the FPGA devices for execution.

(2) The present invention uses an OpenCL framework to develop FPGA programs, so that users can have tasks executed on FPGA units by providing simple C-based kernel programs rather than struggling with complicated hardware details.

(3) The present invention can be implemented by simply modifying existing distributed stream processing systems and enabling OpenCL Host server programs, and is semi-translucent to user programs. This allows users to build topologies in the conventional way with a kernel program additionally provided.

DETAILED DESCRIPTION OF THE INVENTION

For convenient understanding, technical terms used throughout this document are defined as below:

Distributed Stream Processing System: a distributed, high fault-tolerance, real-time computing system configured to process continuous data. Such a system comprises plural input and processing components that form a processing network in the format of time flow, wherein intermediate processing results are stored in memory, thereby ensuring timely data processing, so that the system can provide reliable real-time analytics that required by big data.

Master Node: used to allocate tasks and detect failure.

Slave Node: used to activate or deactivate working processes.

Topology: a logic formed by packing a real-time processing program.

Runtime: a cluster environment existing when an application or a system operates.

Heartbeat: metadata sent by slave nodes in a cluster to Zookeeper. It is used by a master node to synchronize information with slave nodes in a cluster and to check whether the slave nodes operate normally.

Stream Application: a stream data processing application submitted by a user for which a distributed stream processing system receives submitted operation and performs processing and execution.

Kernel File: a file written in the OpenCL language and has an extension of .cl, which contains plural functions each having a prefix of _kernel. Each of the functions corresponds to a computing component in a topology and operates on an accelerator in an FPGA.

Data Dependency: data flow relationship among components in a topology.

For further illustrating the present invention, the following description, in conjunction with the accompanying drawings and preferred embodiments, is set to explain the present invention in detail.

Embodiment 1

Figure 1:
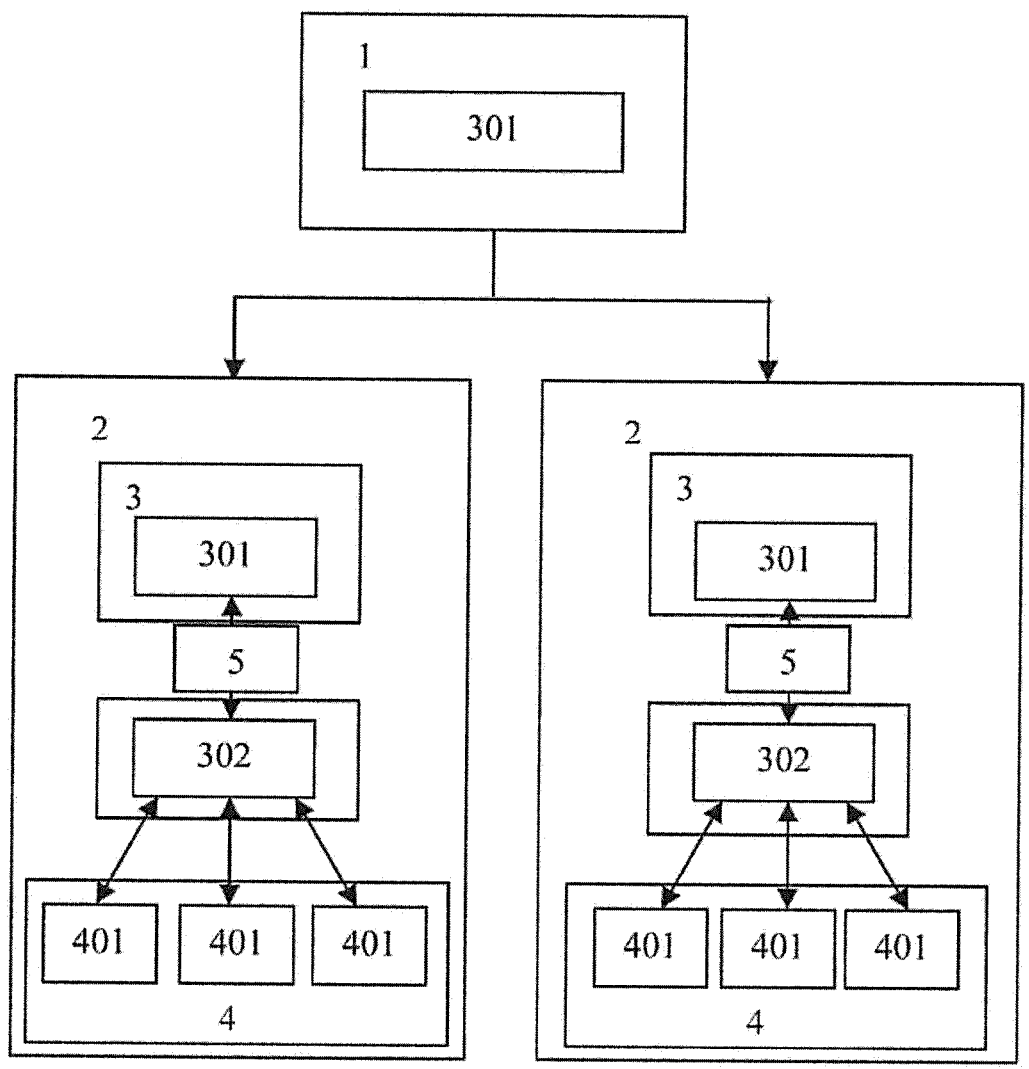
FIG. 1 is a structural diagram of an FPGA-based distributed stream processing system cluster according to one preferred embodiment of the present invention.

As shown in FIG. 1, the present invention provides an FPGA-based distributed stream processing system, which is formed by integrating FPGA devices and a distributed stream processing system. The FPGA-based distributed stream processing system at least comprises at least one master node 1 and a plurality of slave nodes 2. For example, in the distributed stream processing system Storm, the master node 1 is configured with a background program Nimbus miming on a virtual machine. The slave nodes 2 are configured with a plurality of supervisor processes running on the virtual machine. The master node 1 is used to receive a topology submitted by a user, issue codes and assign computing tasks. The supervisor processes running on the slave nodes 2 listen to the computing tasks assigned to the hardware devices and activate or deactivate the processes as required. The Storm is a distributed real-time stream computing framework, which is in the form of time flow. Therein, plural input and processing components form a processing network, and all intermediate processing results are stored in a memory, thereby ensuring timely data processing and effectively providing real-time analytics required by big data.

Preferably, every slave node 2 is configured with a CPU module 3 and a hardware module 4. The CPU module 3 at least comprises a virtual machine 301 and a host end 302. The virtual machine 301 runs supervisor processes. The virtual machine 301 is in communication connection with the host end 302 through a programming interface 5. For example, the programming interface 5 may be a socket, so that data exchange is allowed between the virtual machine and host end. The hardware module 4 at least comprises a plurality of FPGA devices 401. The hardware module 4 and the CPU module 3 are in communication connection through a PCI-E interfaces 6, so that the supervisor processes running on the virtual machine 301 can indirectly acquire FPGA resource information. For example, the FPGA resource information may include the amount of the FPGA devices, the state of every FPGA device, the maximum number of work items the FPGA device supports, and the capacity of the global memory. Preferably, the FPGA resource information can be periodically updated to the runtime of a cluster of distributed stream processing systems through heartbeat. For task scheduling, the master node 1 can acquire the FPGA resource information so as to schedule tasks according to the information. For example, first tasks that are suitable to be processed by the FPGA devices 401 are scheduled to the slave nodes 2 having the FPGA devices for processing. The slave nodes 2 after getting the first tasks activate the relevant FPGA devices 401 through the host end 302. Particularly, the host end 302 after receiving data from the virtual machine 301 transmits the data to the FPGA devices 401 for processing. The results of processing conducted by the FPGA devices are sent back to the host end 302, and then transmitted to relevant threads in the virtual machine 301 through the host end 302 in order to allow the next task to be executed. The present invention introduces FPGA devices into a distributed stream processing system so that the FPGA devices work with the CPU for collaborative computing. By unloading tasked suitable to be executed by FPGA devices to the FPGA devices, the present invention reduces computation latency and improves throughput, thereby providing reduced processing latency, enhanced processing throughput, and in turn improved overall performance of the distributed stream processing system.

Preferably, where a stream application contains first tasks while kernel files or uploading paths of kernel files are both submitted to the master node, the stream application is determined as legitimate and scheduled. Additionally, for scheduling stream processing operation, the master node acquires information about the amount of idle resources corresponding to each slave node based on the runtime of the cluster, so as to assign tasks to be scheduled to the slave nodes that currently have the maximum idle resources.

Embodiment 2

The present embodiment provides further improvements to Embodiment 1, and what is identical to its counterpart in the previous embodiment will not be repeated in the following description.

Figure 2:
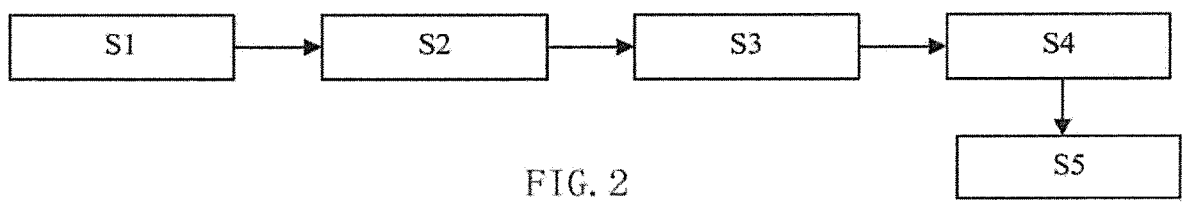
FIG. 2 is a flowchart of an acceleration method for a distributed stream processing system according to one preferred embodiment of the present invention.

As shown in FIG. 2, the present invention further provides an FPGA-based acceleration method for a distributed stream processing system, at least comprises the following steps.

In S1, an FPGA environment and a distributed stream processing system environment are integrated to define an FPGA-based distributed stream processing system.

Figure 3:
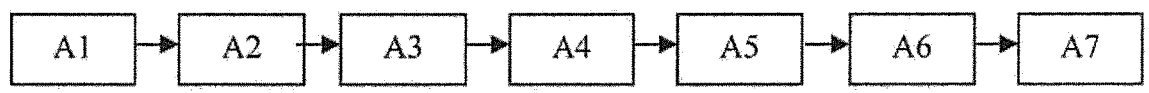
FIG. 3 is a flowchart of integration of an FPGA device environment and a distributed stream processing system environment according to one preferred embodiment of the present invention.

Preferably, plural FPGA devices 401 are installed on slave nodes 2 of the distributed stream processing system cluster. For every slave node 2, a universal programming environment is configured, and a host end 302 that can acquire information about the FPGA devices 401 currently on the slave nodes are built. For example, plural FPGA devices 401 may be installed on slave nodes of an existing distributed stream processing system Storm, and OpenCL is installed and configured for the slave nodes so as to form the universal programming environment. An OpenCL Host server end is built so that it can use various API functions to acquire information about the FPGA devices currently on the physical nodes, thereby obtaining an FPGA-based distributed stream processing system of the present invention by integrating the FPGA devices and the distributed stream processing system. A virtual machine 301 in the distributed stream processing system can interact with the host end 302 so as to acquire information about FPGA resources of the nodes and store the information in the cluster runtime by means of periodical updating. Particularly, as shown in FIG. 3, taking a distributed stream processing system Storm for example, the step of integrating the FPGA environment and the distributed stream processing system Storm environment at least comprises the following steps.

In A1, FPGA devices are installed on slave nodes of the distributed stream processing system cluster by means of interface connection. For example, the FPGA devices may be installed through PCI-E interface.

In A2, on the slave nodes, the FPGA device is configured with a software development kit so as to form a universal programming environment, and a host end is built. The software development kit may be an Intel Opencl SDK. The host end may be an OpenCL Host server end.

In A3, on every slave node, a listening process that listens to computing tasks assigned to the hardware device is activated, and the process is connected to the host end through a programming interface. For example, for a Storm system, the supervisor process can run on every slave node to listen to the computing tasks assigned to the hardware devices. The supervisor process may be connected to the OpenCL Host server end through a socket.

In A4, the listening process running on the slave node sends a request to the host end through the programming interface so as to acquire information about FPGA resource state on the node.

In A5, the host end acquires the FPGA resource state information and feeds it back to the listening process. For example, the host end may acquire the FPGA resource state information through an API function.

In A6, the listening process builds heartbeat based on the fed back FPGA resource state information and periodically synchronizes the information to the runtime of the cluster. The runtime refers to the cluster environment existing when the system or applications operate.

In A7, the master node acquires the heartbeat to schedule operation.

In S2, it is determined whether an operation program submitted by a user is legitimate. If the operation program is legitimate, the master node performs mixed scheduling on the operation.

Figure 4:
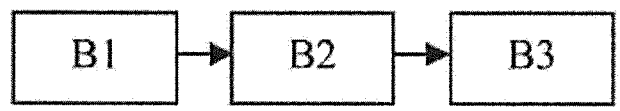
FIG. 4 is a flowchart of submission of user stream processing operation according to one preferred embodiment of the present invention.

Preferably, the stream processing operation submitted by a user is adapted to the heterogeneous resources built based on the introduction of FPGA devices. In other words, when using the programming interface 5 to write the stream processing program, a user has to realize the computing logic into first tasks suitable to be executed in the FPGA devices and second tasks suitable to be executed in the CPU module according to the characteristics of different computing modules in the operation processing logic. Additionally, the user has to submit kernel programs that can be compiled and executed in the FPGA devices together with the stream applications. The kernel program may be an OpenCL kernel program. The stream processing operation submitted by the user is then further examined by the system before submitted to the master node for scheduling. Particularly, as shown in FIG. 4, the step of submitting the operation program at least comprises the following steps.

Figure 5:
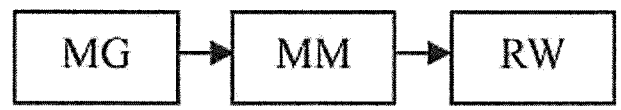
FIG. 5 is a directed acyclic graph according to one preferred embodiment of the present invention.

In B1, the user divided operation into first tasks and second tasks according to the computational characteristics of different parts in the operation. Particularly, when using the programming interface to program stream applications, the user can build at least one directed acyclic graph for data processing. The directed acyclic graph can comprise a plurality of data processing nodes. Every data processing node represents a computing model, so that according to the characteristics of every data processing node, computing modules having simple computing logic can be implemented into second tasks suitable to be executed in the CPU module, and computation-intensive or heavy-load computing modules can be implemented into first tasks suitable to be executed in FPGA devices. Meanwhile, according to the connection among nodes in the directed acyclic graph, data transfer among tasks can be implemented by means of programming. For example, as shown in FIG. 5, a directed acyclic graph of matrix multiplication operation includes three different data processing nodes. MG is a data source node, which continuously produces tuples each having two matrixes, and sends the tuples to the MM data processing node downstream. MM serves to subscribe and receive tuples from the upstream MG, to compute the product of the two matrixes in a tuple, and sending the product to the downstream RW node as a tuple. The RW node serves to subscribe the tuples sent by MM and write the resulting matrix contained therein into a file. Among the foregoing three data processing nodes, MM is a computation-intensive computing module. Thus the user can classify it as a first task when submitting the operation, and classify both MG and RW computing nodes as second tasks.

In B2, the operation submitted by the user is configured with kernel files that can be compiled and executed on the FPGA devices or uploading paths of kernel files, and the files or paths are submitted together with stream applications. Particularly, a kernel file is a kernel function set that is developed for all first tasks in an operation and is to be executed in FPGA. Every kernel function represents a computing module. During development of kernel programs, special attention has been paid to how to efficiently implementing computing logic to that parallelism of FPGA can be leveraged to the most, thereby maximizing improvement in performance. FPGA may be developed using hardware description languages such as Verilog or VHDL. Such development demands highly in terms of hardware knowledge, and this fact prevents FPGA from extensive adoption among developers. The existing high-level language development, such as C/C++/OpenCL, requires users to care about not only implementation details of computing kernels but also control details such as management of FPGA devices, activation of kernels on FPGA devices and transmission of input/output data, so its development is relatively complicated. With the present invention, the submission of FPGA kernel programs by users can be easily achieved by developing a C-like kernel function for each first task using OpenCL. This means users only have to take care of the implementation of computing logics. The present invention unburdens users from control details such as management of FPGA accelerators and data transmission, thereby exempting users from dealing with a large amount of codes and making it easy for users to use FPGA accelerators.

In B3, the stream application is examined for legitimacy. Therein, where the stream application contains first tasks, it is to be determined whether a kernel file or an uploading path of a kernel file has been submitted at the same time. Where there is no kernel file submitted and no file path for a kernel file is set, the operation program submitted by the user is determined as illegitimate. Only an operation program determined as legitimate can are submitted to the master node for scheduling.

Figure 6:
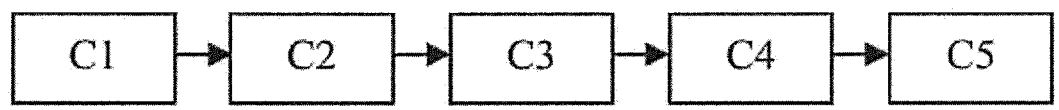
FIG. 6 is a flowchart of mixed scheduling conducted by a master node according to one preferred embodiment of the present invention.

In S3, the master node acquires the operational resources state and the load state, and accordingly allocates and schedules resources. For example, the master node performs pre-processing analytics on the submitted operation program, and conducts different types of scheduling depending on the situation of resources. Particularly, as shown in FIG. 6, the master node allocates and schedules resources through at least the following steps.

In C1, all the stream processing operations to be scheduled in the system cluster are acquired to be pre-processed and then transmitted to the scheduler in the master node for scheduling. For example, the foregoing pre-processing may comprise adding system components and statistic components to the stream processing operation and executing standardization. Particularly, system components are added to the operation by providing components for information reliability and data statistics. Adding system components to the operation can get the metrics of every component in the topology, including the number of tuples processed in different time periods, based on which latency and throughput of data processing can be calculated. The two types of components are referred to as second task execution when the operation is running. The topology is standardized to verify the topology is correct and can be scheduled. Every component in the topology is primarily transformed into an executor corresponding first or second tasks so as to serve for subsequent operation scheduling. Standardization of topologies is conducted through the following steps. In D1, it is first to see whether there is any special component in a topology needing to be operated as a first task. If yes, it is to check whether the topology has set a kernel function designation to be executed on FPGA for each said component and whether a legitimate kernel program has been submitted together with the operation. If the result of the check is positive, it means that the topology is correct and can be scheduled. If the result is negative, the system throws an indication of abnormality, prompting the user that the submission has failed. In D2, for every component in the topology, according to parallelism setting and component type selection made by the user during submission of the topology, executors for first tasks or executors for second tasks of a corresponding amount are instantiated. Particularly, a first tag attribute is initialized in every generated executor. This tag attribute is a Boolean value. If the value is TRUE, it means that this executor is initially an executor for first tasks. If the value is FALSE, it means that this executor is initially an executor for second tasks. Such a tag helps the subsequent scheduler to conduct scheduling. Additionally, a second tag attribute is added to every executor. The tag attribute is also a Boolean value. It indicates whether this executor after scheduled is an executor for first tasks. If the value is TRUE, the result is positive, and otherwise is negative. In this step, the second tag attribute is set to have the same value as that of the first tag attribute.

In C2, a first amount of the first tasks and a second amount of the second tasks in every stream processing operation are counted. Also, a third amount of the FPGA devices that are in the idle state on every slave node is acquired through the runtime of the cluster. Based on the overall load of the stream processing operations, a first overall load of the first tasks and a second overall load of the second tasks can be determined. Based on the overall load of the slave nodes, a third overall load of the idle FPGA devices can be obtained.

In C3, where the third overall load is smaller than or equal to zero, all the stream processing operations are scheduled to the CPU module for execution. Particularly, the third overall load smaller than or equal to zero indicates that there is no idle FPGA device in the system, so the first tasks in the stream processing operations have to be transformed into second tasks, which are then transmitted to the job executor in the CPU module for execution. The second tasks originally in the stream processing operations are scheduled to the CPU module for execution. Task transformation is to modify the second tag attribute value of the executor for first tasks or second tasks generated in the step D2. Preferably, the first and second tasks can exchange mutually through the following steps. First, the second tag attribute value of the executor for the first tasks that have to be transformed into second tasks is changed from TRUE to FALSE. When the supervisor process in every slave node receives tasks assigned by the master node, the supervisor process activates the corresponding executor to execute the first or second tasks according to the second tag attribute of the executor corresponding to the assigned tasks.

In C4, where the third overall load is greater than zero and the first overall load is smaller than the third overall load, the first tasks are scheduled to the FPGA devices for execution, and the second tasks are scheduled to the job executor in the CPU module for execution. The first overall load smaller than the third overall load indicates that there are enough idle FPGA devices in the system, so the first tasks can be all scheduled to the FPGA devices for execution.

In C5, where the third overall load is greater than zero and the first overall load is greater than the third overall load, based on the third overall load, the first tasks are divided into first sub-tasks and second sub-task. The first sub-tasks are scheduled to the FPGA device for execution. The second sub-tasks undergo task transformation to be transformed to second tasks and then transmitted to the job executor in the CPU module for execution. The first overall load greater than the third overall load indicates that the amount of idle FPGA devices is not sufficient to accomplish execution of all the first tasks. In this case, the first tasks have to be divided into first sub-tasks and second sub-tasks to the maximum possible extent according to the third overall load. The result should be that the overall load of the first sub-tasks matches up the third overall load, so that the computing resources of the FPGA devices can be utilized to the greatest possible extent.

Figure 7:
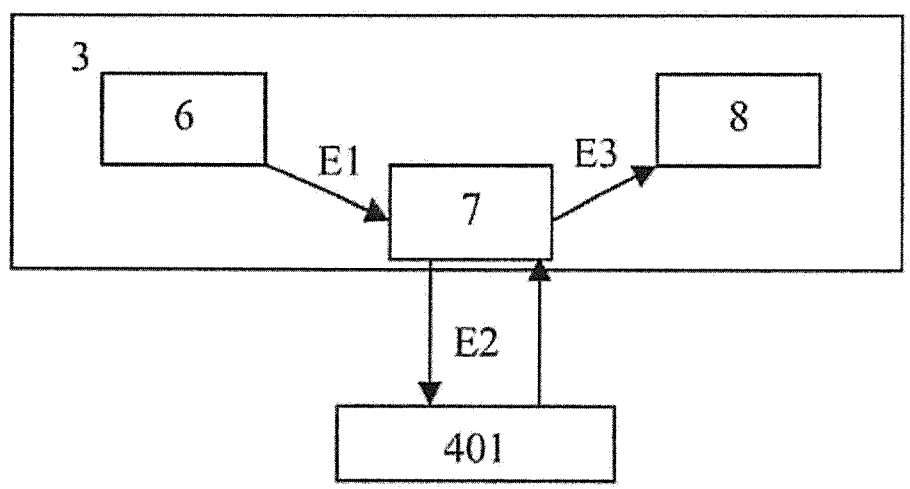
FIG. 7 is a flowchart of collaborative computing conducted by FPGA devices and a CPU module according to one preferred embodiment of the present invention.

In S4, the CPU module and the FPGA devices perform computational processing for the stream processing operation collaboratively. For example, the stream processing operation submitted by the user is first scheduled by the master node and then runs in the cluster in the form of first tasks and second tasks, with data flow between the first and second tasks. Preferably, data dependency exists between the first and second tasks. Transmission and reception of data between the first and second tasks are achieved using through threads and queues. In other words, the data processed upstream by the second tasks are transmitted to the upstream first tasks for processing, and then transmitted to the downstream second tasks for processing. Particularly, as shown in FIG. 7, the CPU module is at least provided with a first job executor 6, a second job executor 7 and a third job executor 8. The CPU module and the FPGA devices collaboratively compute the stream processing operation through at least the following steps.

In E1, the first job executor 6 is configured to receive a plurality entry of data from the upstream component and process them entry by entry in a pipeline-like way after which the processing results are sent to the second job executor 7 located downstream through threads.

In E2, the second job executor 7 is configured to receive the processing results from the first job executor 6 and cache the results to its on-board memory. When the amount of cached data reaches a preset threshold, all the cached data are sent to the FPGA devices through an interface. The FPGA devices are configured to, transmit the computed processing results to the third job executor 8 arranged downstream through the second job executor 7 in a pipeline-like way.

In E3, the third job executor 8 is configured to receive the processing results from the second job executor 7 according to predetermined data dependency, and further compute the results. The data dependency is built when a user builds the topology and it defines the source of input data for every non-data-source computing component in the operation topology. For example, in FIG. 5, the source of input data for MM is the MG component, and the data the RW computing component consumes is output by MM computing.

In S5, the master node assigns tasks of the stream processing operation to the slave nodes according to the amounts of idle resources on the slave nodes, so that loads of the slave nodes are in a relatively balanced state.

Figure 8:
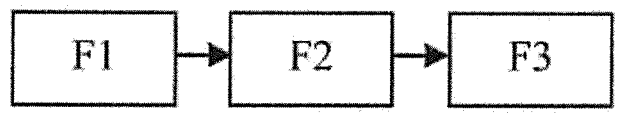
FIG. 8 is a flowchart of load balancing among slave nodes conducted by a master node according to one preferred embodiment of the present invention.

Particularly, as shown in FIG. 8, the master node balances the loads of the slave nodes through the following steps.

In F1, when scheduling stream processing operation, the master node acquires information about the amount of idle resources of every slave node based on the runtime of the cluster.

In F2, for every task to be scheduled, the slave node that has the greatest amount of idle resources is identified, and this task is assigned to that node, after which one is subtracted from the amount of idle resources of that slave node.

In F3, for every task in the task set of the stream processing operation, the step F2 is executed.

Embodiment 3

The present embodiment provides further improvements to the previous embodiments, and what is identical to its counterpart in the previous embodiment will not be repeated in the following description.

The present invention further provides a method for a user to submit an operation program. The method at least comprises the following steps. First, the user divided the operation into first tasks and second tasks based on the computational characteristics of every part of the operation. The operation submitted by the user is configured with kernel files that can be compiled and executed on the FPGA devices or uploading paths of the kernel files, and the files or the paths are submitted together with stream applications. The stream application is examined for legitimacy. Therein, where the stream application contains first tasks, it is to be determined whether a kernel file or an uploading path of a kernel file has been submitted at the same time. Where there is no kernel file submitted and no file path for a kernel file is set, the operation program submitted by the user is determined as illegitimate. Only an operation program determined as legitimate can be submitted to the master node for scheduling.

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. An acceleration method for an FPGA-based distributed stream processing system, which accomplishes computational processing of stream processing operations through collaborative computing conducted by a plurality of FPGA devices and a CPU module and wherein the acceleration method for distributed stream processing system comprises the steps of: building the FPGA-based distributed stream processing system having a master node by installing the FPGA devices on slave nodes; dividing stream applications into first tasks suitable to be executed by the FPGA devices and second tasks suitable to be executed by the CPU module; and where the stream applications submitted to the master node are configured with kernel files that can be compiled and executed by the FPGA devices or with uploading paths of the kernel files, making the master node allocate and schedule resources by pre-processing the stream applications, wherein making the master node allocate and schedule resources includes: acquiring all of the stream processing operations to be scheduled in a system cluster and performing at least addition of system components, addition of data analyzing components and standardization on each said stream processing operation so as to accomplish the pre-processing; obtaining a first overall load of the first tasks, a second overall load of the second tasks and a third overall load of the FPGA devices that is in an idle state; where the third overall load is smaller than or equal to zero, scheduling all the stream processing operations to the CPU module for execution, and where the third overall load greater than zero and the first overall load is smaller than the third overall load, scheduling the first tasks to the FPGA devices for execution and scheduling the second tasks to the CPU module for execution, or where the third overall load is greater than zero and the first overall load is greater than the third overall load, dividing the first tasks into first sub-tasks and second sub-tasks based on the third overall load, wherein the first sub-tasks are scheduled to the FPGA devices for execution and the second sub-tasks are transmitted to the CPU module for execution by transforming the second sub-tasks into the second tasks; and where the stream applications include the first tasks and the kernel files or the uploading paths of the kernel files are all submitted to the master node, determining that the stream applications are legitimate and scheduling the stream applications.

2. The acceleration method for distributed stream processing system of claim 1, wherein the pre-processing further comprises a step of: where there is any special component in topologies that requires operation of the first tasks and a kernel function designation executable to the FPGA devices is configured for the special component, instantiating every component in the topologies into either executors for the first tasks or executors for the second tasks of a corresponding amount based on parallelism settings and choices of component types by which users submitted the topologies.

3. The acceleration method for distributed stream processing system of claim 2, wherein the CPU module further comprises a first job executor, a second job executor and a third job executor, in which the FPGA devices and the CPU module perform collaborative computing on the stream processing operation by following steps: using the first job executor to receive a plurality entries of data transmitted from upstream, to process the data one by one in a pipeline, and to send processing results to the second job executor arranged downstream through threads; using the second job executor to receive the processing results from the first job executor and cache the processing results in an on-board memory thereof, and, when an amount of the cached data reaches a preset threshold, to send all the cached data to the FPGA devices through an interface; and using the third job executor to receive the processing results from the second job executor according to a predetermined data dependency, and to perform subsequent computational processing on the processing results.

4. The acceleration method for distributed stream processing system of claim 2, further comprising a step of: when the master node schedules the stream processing operations, based on a runtime of the cluster, acquiring information about an idle resource amount of each said slave node and allocating tasks to be scheduled to the slave node currently having the idlest resources.

5. The acceleration method for distributed stream processing system of claim 4, wherein the step of building the FPGA-based distributed stream processing system further comprises the steps of: installing the FPGA devices on the slave nodes by means of interface connection, and configuring the slave nodes with a software development kit for the FPGA devices so as to form a universal programming environment, and building a host end; activating a listening process on each said slave node to listen to computing tasks allocated to a hardware device, and connecting the listening process to the host end through a programming interface: making the listening process run on the slave nodes send a request to the host end through the programming interface so as to acquire FPGA resource state information, and making the listening process build heartbeat information on a basis of the FPGA resource state information and periodical synchronize the heartbeat information to the runtime of the cluster; and making the master node acquire the heartbeat information so as to schedule the stream processing operation.

6. The acceleration method for distributed stream processing system of claim 5, wherein the step of dividing the stream applications into the first tasks and the second tasks further comprises the steps of: building a directed acyclic graph that has a plurality of data processing nodes, and implementing each said data processing node as at least one computing model; and implementing the computing model as one said first tasks based on a computational intensity or a data processing load of the computing model.

7. An FPGA-based distributed stream processing system, wherein the FPGA devices and a CPU module conduct computational processing a stream processing operation through collaborative computing, the system being characterized in having a master node and being built by installing the FPGA devices to slave nodes, being configured to: divide stream applications into first tasks suitable to be executed by the FPGA devices and second tasks suitable to be executed by the CPU module; and where the stream applications submitted to the master node are configured with kernel files that can be compiled and executed by the FPGA devices or with uploading paths of the kernel files, make the master node allocate and schedule resources by pre-processing the stream applications; and wherein making the master node allocate and schedule the resources at lease comprising: acquiring all of the stream processing operations to be scheduled in a system cluster and performing at least addition of system components, addition of data analyzing components and standardization on each said stream processing operation so as to accomplish the pre-processing; obtaining a first overall load of the first tasks, a second overall load of the second tasks and a third overall load of the FPGA devices that is in an idle state; and where the third overall load is smaller than or equal to zero, scheduling all the stream processing operations to the CPU module for execution, and where the third overall load greater than zero and the first overall load is smaller than the third overall load, scheduling the first tasks to the FPGA devices for execution and scheduling the second tasks to the CPU module for execution, or where the third overall load is greater than zero and the first overall load is greater than the third overall load, dividing the first tasks into first sub-tasks and second sub-tasks based on the third overall load, wherein the first sub-tasks are scheduled to the FPGA devices for execution and the second sub-tasks are transmitted to the CPU module for execution by transforming the second sub-tasks into the second tasks; and where the stream applications include the first tasks and the kernel files or the uploading paths of the kernel files are all submitted to the master node, determining that the stream applications are legitimate and scheduling the stream applications.

* * * * *